(12) United States Patent
Teixeira et al.

(10) Patent No.: US 10,341,364 B2
(45) Date of Patent: Jul. 2, 2019

(54) SYSTEMS AND METHODS FOR MONITORING AND MITIGATING NETWORK ATTACKS

(71) Applicant: Corero Networks Security, Inc., Hudson, MA (US)

(72) Inventors: Thomas J. Teixeira, Harvard, MA (US); Thomas C. Porcher, Stow, MA (US)

(73) Assignee: Corero Networks Security, Inc., Hudson, MA (US)

( * ) Notice: Subject to any disclaimer, the term of this patent is extended or adjusted under 35 U.S.C. 154(b) by 459 days.

(21) Appl. No.: 15/056,254

(22) Filed: Feb. 29, 2016

(65) Prior Publication Data

US 2016/0323302 A1 Nov. 3, 2016

Related U.S. Application Data

(60) Provisional application No. 62/126,191, filed on Feb. 27, 2015.

(51) Int. Cl.
*H04L 29/06* (2006.01)
*H04L 12/911* (2013.01)

(52) U.S. Cl.
CPC ...... *H04L 63/1416* (2013.01); *H04L 63/0227* (2013.01); *H04L 63/1441* (2013.01); *H04L 69/22* (2013.01)

(58) Field of Classification Search
CPC ............. H04L 63/1416; H04L 63/1441; H04L 63/0227; H04L 47/70; H04L 43/02; H04L 69/22
See application file for complete search history.

(56) References Cited

U.S. PATENT DOCUMENTS 6,728,788 B1 4/2004 Ainsworth et al.
7,454,418 B1 * 11/2008 Wang .................... G06F 21/577
707/6

(Continued)

OTHER PUBLICATIONS

Byoungkoo Kim et al. "Multi-hash based Pattern Matching Mechanism for High-Performance Intrusion Detection" International Journal of Computers Issue 1, vol. 3, 2009 (pp. 115-124) https://pdfs.semanticscholar.org/f6d5/35397e91626e592fe953dff8665aa8882eaa.pdf.*

(Continued)

*Primary Examiner* — Joseph P Hirl
*Assistant Examiner* — Thomas A Gyorfi
(74) *Attorney, Agent, or Firm* — Goodwin Procter LLP

(57) ABSTRACT

In a system for detecting and optionally blocking packets from an attacker, an improved multi-hash process, in which rate information for one or more packet signatures is computed by individual modules, where each module corresponds to a different hash function, and is shared across the modules to determine maximum observed rates for the signatures within a specified observation window. A moving average of the maximum rates can be computed across several observation windows, to optimize false negative and false positive detections. The modules may designate certain packets as potentially harmful and/or may block such packets, according to a corresponding maximum rate and specified threshold.

42 Claims, 5 Drawing Sheets

(56) References Cited

U.S. PATENT DOCUMENTS

| | | | |
|---|---|---|---|
| 8,014,278 B1 | 9/2011 | Subramanian et al. | |
| 8,578,024 B1* | 11/2013 | Keralapura | H04L 43/026 709/224 |
| 8,839,417 B1* | 9/2014 | Jordan | H04L 63/1416 726/22 |
| 2003/0140180 A1 | 7/2003 | Brown et al. | |
| 2004/0125799 A1* | 7/2004 | Buer | H04L 45/00 370/389 |
| 2008/0120721 A1* | 5/2008 | Moon et al. | H04L 63/1416 726/23 |
| 2009/0100055 A1* | 4/2009 | Wang | G06F 21/577 707/6 |
| 2009/0328219 A1 | 12/2009 | Narayanaswamy | |
| 2013/0152196 A1 | 6/2013 | Garg et al. | |
| 2014/0096148 A1 | 4/2014 | Yakovenko et al. | |
| 2016/0226890 A1* | 8/2016 | Harang | H04L 63/1408 |

OTHER PUBLICATIONS

Haoyu Song et al. "Multi-pattern Signature Matching for Hardware Network Intrusion Detection Systems" IEEE Globecom 2005, St. Louis MO, Nov. 28, 2005 (5 pages) http://citeseerx.ist.psu.edu/viewdoc/download?doi=10.1.1.61.5281&rep=rep1&type=pdf.*

* cited by examiner

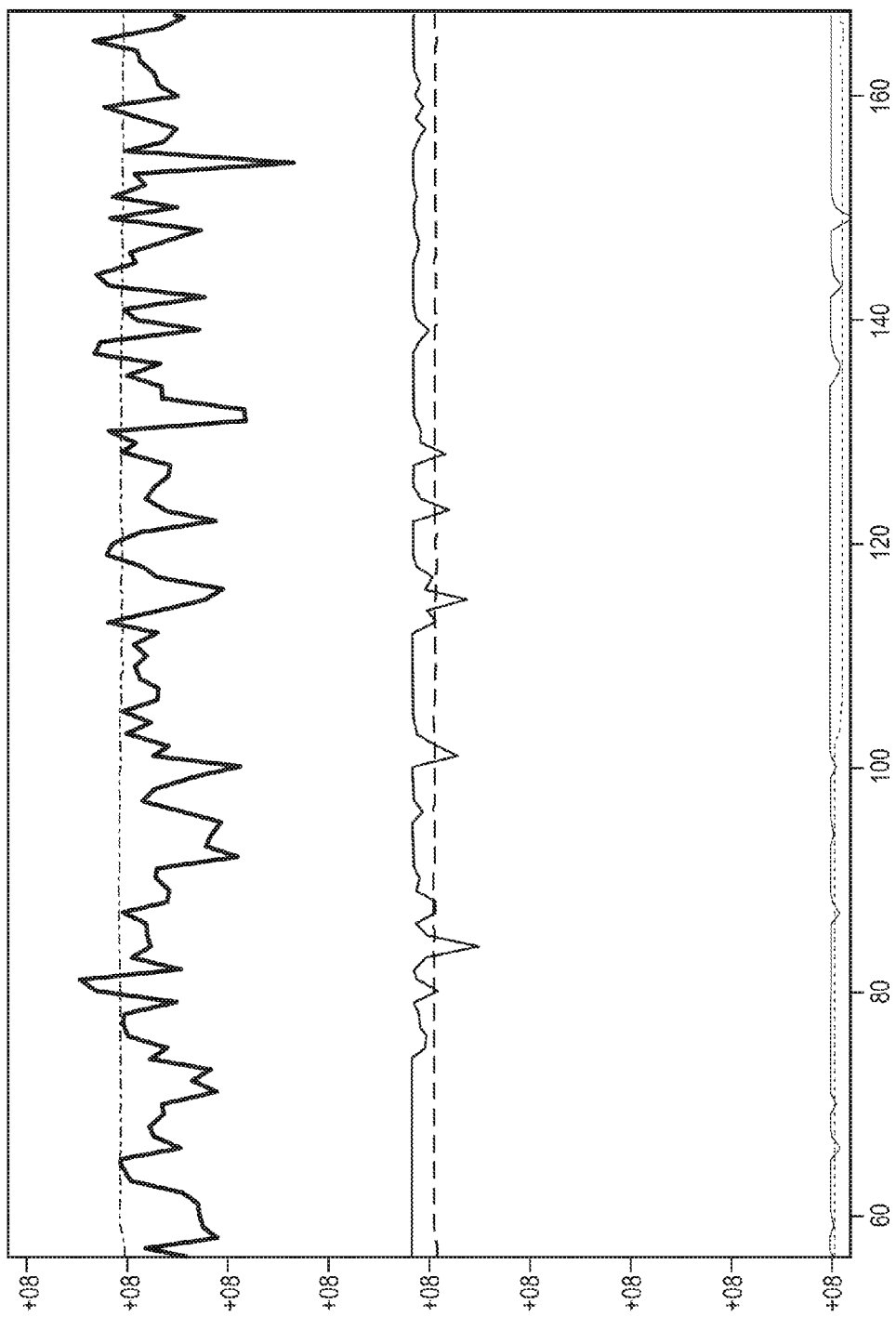

SYSTEMS AND METHODS FOR MONITORING AND MITIGATING NETWORK ATTACKS

CROSS-REFERENCE TO RELATED APPLICATIONS

This application claims priority to and benefit of U.S. Provisional Patent Application No. 62/126,191, entitled "Systems and Methods for Monitoring and Mitigating Network Attacks," filed on Feb. 27, 2015, the entire contents of which are incorporated herein by reference.

FIELD OF THE INVENTION

This disclosure generally relates to network traffic analysis and, in particular, to traffic analysis for identification of an attack on a network device.

BACKGROUND OF THE INVENTION

A network device such as a web server, a firewall computer, etc., can be targeted by an attacker to disrupt or even prevent the operation of the network device. For example, an attacker may install a computer virus and/or spyware to damage and/or access protected information. One or more attackers may also launch a denial of service (DoS) or distributed denial of service (DDoS) attack. In general, in a DoS/DDoS attack, a targeted network device is flooded with requests so that the resources of the network device, such as memory, communications and/or data processing subsystems, are overwhelmed. This can adversely affect, e.g., significantly slow down or even shutdown one or more services (e.g., rendering content via a network, performing Internet search, domain name search, performing a financial transaction, etc.), provided by the network device to legitimate users.

Several techniques that can detect and/or mitigate DoS/DDoS and other types of attacks typically require monitoring a sequence of packets arriving at a network device for processing thereby. The sequence can represent one or more flows, where different flows may relate to different types of service requests, service requests from different users, responses to one or more services requested by the network device, etc. In general, the arriving packets are analyzed to decipher patterns that can be used to distinguish the packets sent by one or more attackers from the packets sent by one or more legitimate users. The packets identified/designated as transmitted by an attacker may be dropped, i.e., such packets are not allowed to be processed by the network device. This general approach, however, presents some challenges.

First, the rate at which packets arrive at a typical network device, and at a firewall computer in particular, is so large that the analysis of the packets for deciphering patterns is computationally expensive, generally requiring millions of computations per second. Second, even if significant processing power is allocated for the analysis, aggressively designating a packet as transmitted by an attacker can increase a false positive rate, i.e., packets sent by legitimate users may be dropped which, in effect, is a disruption of the service(s) provided by the network device. A relatively less aggressive analysis, however, can increase a false negative rate, allowing packets sent by one or more attackers to reach the network device, thereby causing harm thereto.

SUMMARY

Various embodiments described herein facilitate efficient monitoring and analysis of packets arriving at a network device to identify the packets arriving from one or more attackers while minimizing both the false negative and false positive rates. This is achieved, in part, by dividing the sequence of packets into several modules (also called pipelines), allowing for parallel processing of a relatively small number of packets per pipeline. In each pipeline, a signature is generated for each packet. The signature can be constructed to detect a service flood in which an attacker, i.e., one or more processors, computers, servers, etc., sends a large number of requests to the targeted network device, or to detect a reflection flood. In a reflection flood, the attacker causes one or more third-party devices (computers, servers, etc.) to send numerous requests to the targeted network device.

The signatures are processed to determine a frequency or a rate at which a particular signature is present in a pipeline. The rate can be updated on a rolling basis, e.g., at a specified period, and can represent a rate at which the packets associated with the signature are arriving at a particular time. Additionally or in the alternative, the rate can represent byte rate. Even when pipelines are used, the number of packets arriving during a small time period (e.g., 1 s), and the number of unique signatures corresponding to those packets are typically so large that storage of the signatures and analysis thereof to compute the rates is not practical.

A hashing technique, such as multi-hashing, can be used so that the amount of required storage can be reduced, and the processing delays can be reduced, as well. Any hashing technique generally introduces, however, a likelihood of collision. A collision occurs if two different signatures map to the same key and, as such, data associated with one signature is replaced with the data associated with another signature. This can cause the computation of the rates described above to underestimate the rates which, in turn, can increase the false negative rate.

While multi-hashing can minimize the occurrence of collisions relative to a single hashing technique, collisions may still occur. Therefore, in various embodiments, a maximum rate value is shared across different hash tables in each pipeline. Moreover, the information across different pipeline may also be shared to minimize the false positive and/or false negative rates while accounting for possible load imbalances across the pipelines.

Accordingly, in one aspect, a method is provided for facilitating protection of a network system, that includes performing by at least one processor the following steps. In a first module (also referred to as a pipeline) that receives packets, for a signature, during a first observation window (that may be denoted $\delta 1$): (a) computing a number of indices using a several hash functions and the signature. The method also includes: (b) for each non-colliding index from the number of indices, updating a respective signature rate, representing a frequency of occurrence of the signature in the first module during the first observation window. Thus, $\delta 1 \cdot r_1^{S1}(1), \delta 1 \cdot r_1^{S1}(2), \ldots, \delta 1 \cdot r_1^{S1}(K)$, may be computed where $\delta 1$ represents the first observation window, and $r_1^{S1}(l)$ represents the rate of signature $\delta 1$ as computed by the l-th hash table of the first module (e.g., pipeline 1) during the first observation window, where pipeline 1 may include K hash tables. The method also includes: (c) designating a maximum of the signature rates that correspond to the non-colliding indices and that are updated during the first observation window as a first local maximum signature rate for the first module for the first observation window. Thus, the computation $\delta 1 \cdot R_1^{S1} = \max(\delta 1 \cdot r_1^{S1}(1), \delta 1 \cdot r_1^{S1}(2), \ldots, \delta 1 \cdot r_1^{S1}(K))$, may be performed where $\delta 1 \cdot R_1^{S1}$ is the maximum of all of the rates computed by the up to K hash tables for S1 in pipeline 1, during the first observation window δ1.

In some embodiments, the method further includes in the first module, for the signature, during a second observation window: (d) repeating the steps (a) through (c) to obtain a second local maximum signature rate for the first module for the second observation window. Thus, the computation of $\delta 2 \cdot r_1^{S1}(1), \delta 2 \cdot r_1^{S1}(2), \ldots, \delta 2 \cdot r_1^{S1}(K)$, may be performed where δ2 represents the second observation window, and $r_1^{S1}(l)$ now represents the rate of signature S1 as computed by the l-th hash table of the first module (e.g., pipeline 1) during the second observation window. This computation may be followed by the computation: $\delta 2 \cdot R_1^{S1} = \max(\delta 2 \cdot r_1^{S1}(1), \delta 2 \cdot r_1^{S1}(2), \ldots, \delta 2 \cdot r_1^{S1}(K))$, where $\delta 2 \cdot R_1^{S1}$ is the maximum of all of the rates computed by the up to K hash tables for S1 in pipeline 1 during the second observation window δ2. The method may also include (e) averaging the first and second local maximum signature rates for the first module to obtain an average signature rate for the first module. Thus, $\overline{R}_1^{S1} = w_1 * \delta 1 \cdot R_1^{S1} + w_2 * \delta 2 \cdot R_1^{S1} + \ldots + w_\tau * \delta \tau \cdot R_1^{S1}$, may be computed where $\overline{R}_1^{S1}$ generally represents a smoothing or digital low pass filtering (e.g., simple, weighted, exponential, etc., averaging) of the local maximum signature rates for the first module/pipeline corresponding to different observation windows. The averaging step may include computing one of: (i) a simple average, (ii) a weighted average, and (iii) an exponential average.

In some embodiments, the method further includes, in a second module, for the signature, during the first observation window: (f) repeating the steps (a) through (c) to obtain a third local maximum signature rate for the second module for the first observation window. Thus, $\delta 1 \cdot r_2^{S1}(1), \delta 1 \cdot r_2^{S1}(2), \ldots, \delta 1 \cdot r_2^{S1}(K)$ may be computed, where δ1 represents the first observation window, and $r_2^{S1}(l)$ represents the rate of signature S1 as computed by the l-th hash table of the second module (e.g., pipeline 2) during the first observation window. The second module/pipeline 2 may also include K hash tables or less than or more than K hash tables. This may be followed by the computation: $\delta 1 \cdot r_2^{S1}(1), \delta 1 \cdot r_2^{S1}(2), \ldots, \delta 1 \cdot r_2^{S1}(K))$, where $\delta 1 \cdot R_2^{S1}$ is the maximum of all of the rates computed by the up to K hash tables for S1 in pipeline 2, during the first observation window δ1.

In addition, the method may include, in the second module, for the signature, during the second observation window: (g) repeating the steps (a) through (c) to obtain a fourth local maximum signature rate for the second module for the second observation window. Thus, $\delta 2 \cdot r_2^{S1}(1), \delta 2 \cdot r_2^{S1}(2), \ldots, \delta 2 \cdot r_2^{S1}(K)$, may be computed where δ2 represents the second observation window, and $r_2^{S1}(l)$ represents the rate of signature S1 as computed by the l-th hash table of the second module (e.g., pipeline 2) during the second observation window. This may be followed by the computation: $\delta 2 \cdot R_2^{S1} = \max(\delta 2 \cdot r_2^{S1}(2), \ldots, \delta 2 \cdot r_2^{S1}(K))$, where $\delta 2 \cdot R_2^{S1}$ is the maximum of all of the rates computed by the up to K hash tables for S1 in pipeline 2, during the second observation window δ2. The method may also include (h) averaging the third and fourth local maximum signature rates for the second module to obtain an average signature rate for the second module. Thus, $\overline{R}_2^{S1} = w_1 * \delta 1 \cdot R_2^{S1} + w_2 * \delta 2 \cdot R_2^{S1} + \ldots + w_\tau * \delta \tau \cdot R_2^{S1}$, may be computed where $\overline{R}_2^{S1}$ is a moving local average (simple, weighted, exponential, etc.,) of the local maximum signature rates for the second module/pipeline corresponding to τ different observation windows. In some embodiments, the method further includes: (i) computing an aggregate rate for the signature by aggregating the average signature rate for the first module and the average signature rate for the second module. In general, the averaged signature rates can be aggregated across all pipelines such that: $\overline{R}^{S1} = \overline{R}_1^{S1} + \overline{R}_2^{S1} + \ldots + \overline{R}_P^{S1}$, where $\overline{R}_p^{S1}$ is the average rate for S1 for the p-th pipeline.

In some embodiments, the method includes determining according to a first frequency at least one of: (i) a duration of the first observation window, and (ii) a time period between the first and second observation windows. Computing the aggregate may be performed at either the first frequency or a second frequency different from the first frequency. The second frequency is typically smaller than the first frequency. The method may also include determining that the network device is susceptible to an attack when the aggregate rate for the signature is at least equal to a specified threshold. The specified threshold can be specific to the signature or may be independent of the signature. In some embodiments, a frequency according to which a duration of the first observation window, and/or a time period between the first and second observation windows is determined may be increased when it is determined that the network device is susceptible to an attack.

In some embodiments, the method includes designating a rate limit to the first module for the signature, where the rate limit is based on, at least in part, a specified threshold and a ratio of the average signature rate for the first module to the aggregate rate for the signature. The method may also include (i) determining that the network device is susceptible to an attack when the average signature rate for the first module is greater than or equal to the rate limit designated to the first module for the signature, and/or (ii) blocking at least a fraction of packets that are received at the first module and that are associated with the signature when the average signature rate for the first module is greater than or equal to the rate limit designated to the first module for the signature. A frequency according to which: (i) a duration of the first observation window, and/or (ii) a time period between the first and second observation windows is determined may be increased when the network device is determined to be susceptible to an attack.

In some embodiments, the method includes: in a second module, for the signature, during the first observation window: (j) repeating the steps (a) through (c) to obtain a fifth local maximum signature rate for the second module for the first observation window. Thus, $\delta 1 \cdot r_2^{S1}(1), \delta 1 \cdot r_2^{S1}(2), \ldots, \delta 1 \cdot r_2^{S1}(K)$, may be computed where δ1 represents the first observation window, and $r_2^{S1}(l)$ represents the rate of signature S1 as computed by the l-th hash table of the second module (e.g., pipeline 2) during the first observation window. The second module/pipeline 2 may include K, less than K or more than K hash tables. This is followed by the computation: $\delta 1 \cdot R_2^{S1} = \max(\delta 1 \cdot r_2^{S1}(1), \delta 1 \cdot r_2^{S1}(2), \ldots, \delta 1 \cdot r_2^{S1}(K))$, where $\delta 1 \cdot R_2^{S1}$ is the maximum of all of the rates computed by the up to K hash tables for S1 in the second module/pipeline 2, during the first observation window δ1. The method may also include (k) computing a first aggregate rate for the signature for the first observation window by aggregating the first local maximum signature rate for the first module for the first observation window and the fifth local maximum signature rate for the second module for the first observation window. Thus, the following computation may be performed: $\delta 1 \cdot R^{S1} = \delta 1 \cdot R_1^{S1} + \delta 1 \cdot R_2^{S1} + \ldots + \delta 1 \cdot R_P^{S1}$, where $\delta 1 \cdot R^{S1}$ is the total rate for S1 during the first observation window only, aggregated over all modules/pipelines, where the number of pipelines is P. The method may also include: computing a second aggregate rate for the signature for a second observation window; and computing an average of the first and second aggregate rates for the first and second observation windows, respectively, for the signature.

In some embodiments, the method further includes generating the signature by selecting respective values of a number of fields of a packet. The several fields may be selected for detecting a service flood, a reflection flood, and/or a server flood. The method may include generating several different signatures for a single packet, where each signature includes respective values of a respective group of fields of the packet. The steps (a) through (c) may be repeated for each one of the several signatures. A group of fields may include one or more fields. The signatures may be ordered according to a specificity of the signature prior to performing the step (a).

In some embodiments, the method includes distributing packets in the sequence of packets to a number of modules, that may include the first module. In some embodiments the method includes resetting a signature rate at a colliding index. The signature rate at a colliding index may be reset in some embodiments only if the signature rate at the colliding index is less than the first local maximum signature rate for the first module for the first observation window. The method may include updating a signature rate at each non-colliding index to the first local maximum signature rate for the first module for the first observation window.

In another aspect, a system is provided for facilitating protection of network system. The system includes a first processor and a first memory in electrical communication with the first processor, the first memory includes instructions which, when executed by a first processing module in electronic communication with a first memory module, configure the first processing module for receiving packets during a first observation window. In addition, the instructions program the first processing module, for a signature, to: (a) compute several indices using a number of hash functions and the signature. The instructions also program the first processing module to: (b) for each non-colliding index from the several indices, update a respective signature rate, representing a frequency of occurrence of the signature in the first processing module during the first observation window. Moreover, the instructions program the first processing module to: (c) designate a maximum of the signature rates that correspond to the non-colliding indices and that are updated during the first observation window as a first local maximum signature rate for the first processing module for the first observation window.

In various embodiments, the instructions can program the first processing module, a second processing module, and/or a processing unit to perform one or more of the method steps described above. The first processing module, the second processing module, and/or the processing unit may include the first processor. The first memory module may include the first memory and/or a second memory.

In another aspect, an article of manufacture is provided for facilitating protection of a network device. The article includes a non-transitory storage medium having stored therein instructions which, when executed by a processing apparatus, program the processing apparatus, which is in electronic communication with a memory module, to (a) compute several indices using a number of hash functions and the signature. The instructions also program the processing apparatus to: (b) for each non-colliding index from the several indices, update a respective signature rate, representing a frequency of occurrence of the signature in a first processing module during the first observation window. Moreover, the instructions program the processing apparatus to: (c) designate a maximum of the signature rates that correspond to the non-colliding indices and that are updated during the first observation window as a first local maximum signature rate for the first processing module for the first observation window.

In various embodiments, the instructions can configure the processing apparatus as the first processing module, a second processing module, and/or a processing unit, and/or to perform one or more of the method steps described above.

BRIEF DESCRIPTION OF THE DRAWINGS

In the following description, various embodiments of the present invention are described with reference to the following drawings, in which:

FIGS. 2A and 2B depicts experimental results, according to various embodiments.

DETAILED DESCRIPTION

Overview of Scorecard System and Process

Figure 1:
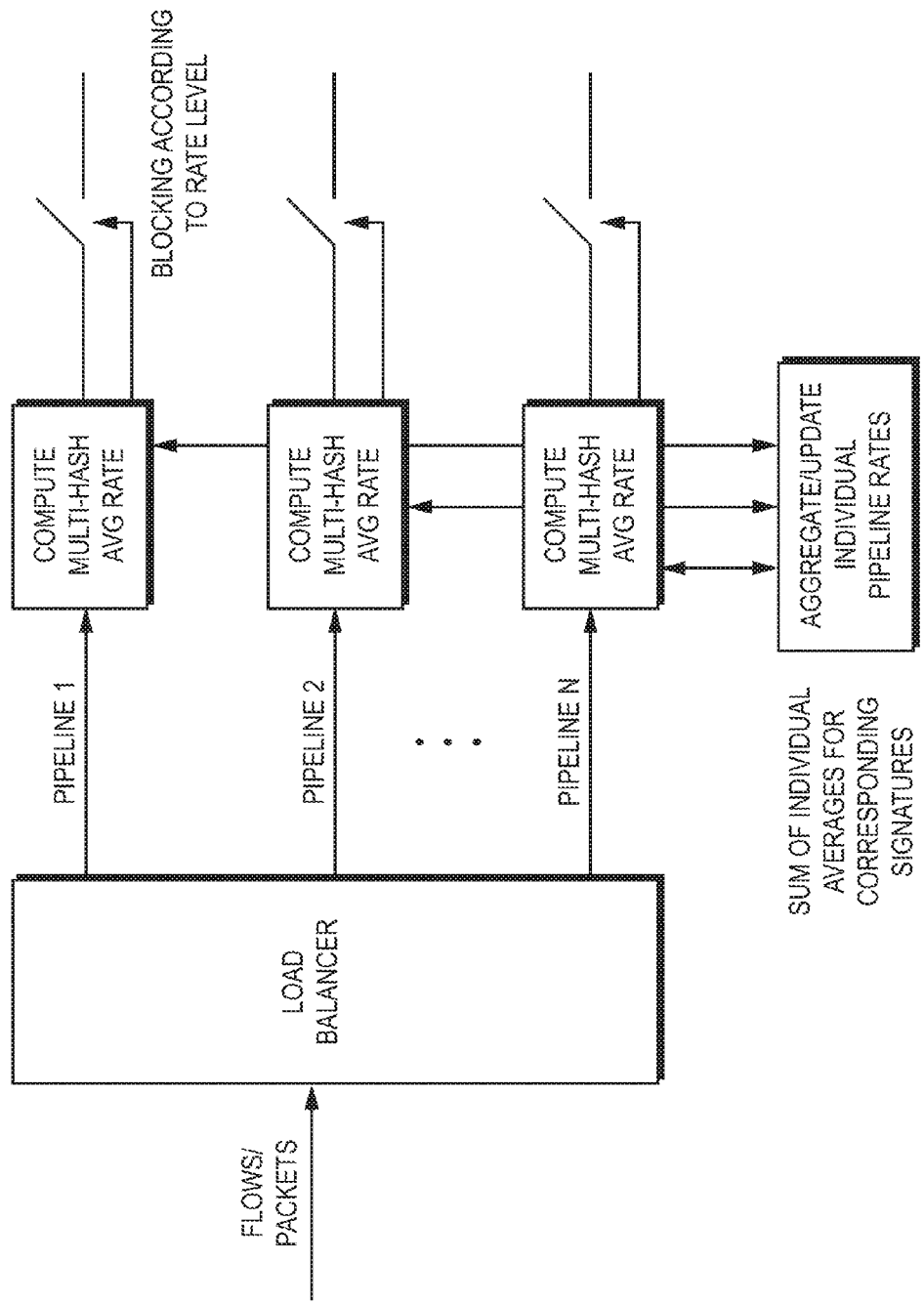
FIG. 1 schematically depicts a system for processing arriving packets, according to one embodiment.

The Scorecard feature is designed to detect servers at risk of being flooded with requests, and to block or filter packets when a threshold is reached. This feature can compute the incoming rates for a of services (e.g., a few hundred, a few thousands, tens or hundreds of thousands, tens of millions, etc.). An event can be triggered when any service's rate exceeds a configurable limit/threshold. Limits/thresholds are set for packet rate and/or byte rate. The Scorecard can also track rates for possible reflection-attacks, using a second set of counters. Other types of attacks can be tracked by adding more sets of counters, according to available processing power and to a lesser extent, available memory.

Detection

Detection can be done by using a hash of a tuple ("signature") which is expected to identify a particular server and the source of excess traffic.

For service flood rate tracking, in one embodiment the signature includes the tuple: (destination address, destination port, protocol, packet length, TTL [bits 7 . . . 3], some TCP flags). TTL is included in this embodiment because the source IP address is often spoofed, but attackers usually have difficulty disguising their network distances (i.e., TTL). However, some low order bits may be masked from TTL to allow for some variation without reducing the rate per signature as much, although different hash keys may be generated for some TTL values that are only one unit apart. For reflection flood rate tracking, in one embodiment, the signature includes the tuple: (destination address, source port, protocol, packet length).

Each tracked service is identified by a signature which includes the fields specific to that service. The tuple "dip=111.212.34.5,prot=17,dprt=53,plen=112,ttl=12, flags=SYN:ACK" is an example of a service flood signature. The tuple "dip=111.212.34.5,prot=6,sprt=53,plen=112" is an example of a reflection flood signature.

In various embodiments, a signature for service floods includes values of the fields destination IP, destination port, protocol, some TCP flags, log 2 of packet length, and high order bits of IP TTL/hop count, which can help identify a host which is forging the source IP address but cannot forge the TTL, which depends on the number of routers between the attacker and the target. Different protocols and TCP flags allow us to distinguish TCP SYN or TCP RST floods from UDP floods.

In various embodiments, a signature for reflection floods includes values of the fields destination IP, source port, and log 2 of packet length. Some signatures, e.g., to detect server flood, may include values of the field destination IP address only. For detecting certain attacks fragments may be included. In some instances, only the first fragment includes port information. In some embodiments, the choice of fields used in generating a signatures is modified at run time. For example, a set of protocol features that may be included in a signature can be selected at runtime. A signature may include features using information from deeper protocol layers such as whether a packet contains a domain name system (DNS) response for a recursive request (such as that described RFC 1035, which is incorporated herein by reference in its entirety).

A signature can be expressed/stored in two alternative formats, namely, quoted or expanded. The following is an example of a quoted signature sample:
cat=network,type=top-svc-fld,v=1,sig1='dip=111.212.34.5, dprt=53,len=112,ttl=12,fl1=SYN:ACK',br1=2923232, pr1=1212 121, sig2='dip=1.2.77.5,dprt=11,len=244,ttl=12, flags=SYN',br2=4923232,pr2=3212121, sig3=' . . . ', . . .
The following is an example of an expanded signature sample:
cat=network,type=top-svc-fld,v=1,dip1=111.212.34.5, dprt1=53,len1=112,ttl1=12,fl1=SYN:ACK,br1=2923232, pr1=121212 1, dip2=1.2.77.5,dprt2=11,len2=244,ttl2=12, fl2=SYN,br2=4923232,pr2=321212, dip3= . . . , . . .

Configuration

In some embodiments, for each type of tracking, the system can be configured to monitor either or both of two limits, namely, max byte rate and max packet rate. In some embodiments, the rates may be computed per second, and the tuples are generally not configurable. In some embodiments, the tuples can be configured during execution, e.g., using just-in-time (JIT) compilation techniques.

Events

Each tracking type has two associated events: Byte rate exceeded and Packet rate exceeded. These events may fire for each packet while the rate from this match continues to occur. An event can be marked as Block or Detect. Block may require a total blocking or partial blocking, also called filtering. The events generally trigger automatically and can control traffic when they are set to Block.

Processing

Collecting rate information for a potentially large number of events using bounded time and space can be challenging. If each event is defined by a key or signature with a large number of bits relative to the memory available for storing counters. Conceptually, the solution is to use associative arrays (e.g., dictionaries in Python, maps in the C++ Standard Template Library, etc.). Syntactically, the associative arrays are similar to conventional arrays, except the array indices tend not to be integers, which can make the size of storage required and access time impractical for typical analysis of the packets. Specifically, as each event is detected, the associative array element rate[event] is incremented. To calculate a rate, the entire array is periodically set to zero, or more complex smoothing algorithms can be applied. A common algorithm is exponential averaging where the average at time t is computed from the average at time t−δ and the number of events in the interval [t−δ, t], using the expressions:

ave[event,$t$]=ave[event,$t$−δ]*(1−α)+rate[event]*α rate[event]=0

The value of α has a value greater than 0 and less than or equal to 1. Often α is chosen to be a negative power of 2 so multiplication by a can be implemented by right shifting. The case where no averaging is performed corresponds to setting α to 1.

In this algorithm, the associative array ave[event] can have a very large number of elements, and periodically iterating over the array can take a very long time. In addition, the implementation of general associative arrays can take substantial amounts of time and space. Moreover, typical implementations (such as those using balanced trees), need to grow as elements are added to the associative array, making these implementation and/or use of associative arrays for detection of harmful traffic impractical, if not infeasible, in typical situations in which such monitoring is performed.

A hash table with only one slot per bucket may be used. For example, when an event occurs:

```
index = hash(event) % number of elements in rate
if key[index] is event
then
    rate[index] = rate[index] + 1
else
    // A different event was previously stored at key[index]
    key[index] = event
    rate[index] = 1
```

In various embodiments, the hash table has a specified number of elements. Using the modulus operation (indicated by the "%" symbol) can ensure that the computed index is in the range 0 . . . n−1 where n is the specified number of elements in the hash table. In some embodiments, the size of the hash table (n) may be configurable at run time, i.e., the size of the hash table (the number of elements stored therein) may be increased or decreased in operation, at runtime. In some embodiments, however, the number of elements is selected at compile time. An embodiment of the procedure described above uses two identically sized arrays, namely, key and rate. In some embodiments, a data structure having elements key and rate can be used, and a single table of this data structure may be used to store the values thereof, e.g. table[index].key and table[index].rate, instead of using two different arrays, lists, etc.

By setting rate[index] to 1 if there is a collision, rate [index] is a lower bound on the number of times the event occurred. Instead, if rate[index] is always incremented (an, as such, key[index], rate[index] need not be stored), the rate becomes an upper bound on the number of times event occurred. Using a lower bound leads to false negatives when looking for rates that exceed a threshold, while using an upper bound often leads to false positives.

A multiple hash function can improve detection accuracy. In using multiple hash functions, rate and key each are expressed as two-dimensional arrays. In one embodiment, in a multi-hash process:

```
for each hash function hash_i
    index _i = hash_i(event) % number of elements in rate[i]
    if key[i][index_i] is event
    then
        rate[i][index_i] = rate[i][index_i] + 1
    else
```

-continued

```
key[i][index_i] = event
rate[i][index_i] = 1
```

Instead of using a single value of rate[index] to estimate the rate for an event, the maximum of rate[i][index_i] can be used. In general, if the different hash functions are mutually independent, for an observed event, while there could be a collision for some value of i=p (i.e., using the hash function hash_p), which would reset rate[p][index_p], there may not be a collision for another value of i=q (i.e., using the has function hash_q). As such rate[q][index_q] would increment even though rate[p][index_p] is reset.

In some embodiments, the multi-hash technique is further improved by using the current maximum value each time a collision is detected, so all entries for the same event key have the same value. In general, index_p need not be the same as index_q. For example, given an event, rate[p][34] may be reset to "1" and, for the same event, rate[q][201] may be incremented by one to say 105. Also for that same event, the hash function hash_r may generate index_r=78, and would not find a collision so that rate[r][78] may also be incremented by one to say 23. In this example, the maximum value corresponding to the event is 105, as represented by rate[q][201]. The system keeps track of the fact that rate[q][201] and rate[r][78] represent rates corresponding to the same event, as computed using hash_q and hash_r, respectively. To minimize the likelihood that two or more hash functions would simultaneously result in collision for a received event, the hash functions are generally selected such that they are mutually mathematically independent. Typically, there is no correlation for values which can cause collisions in the different hash functions.

This improvement can handle event sequences with several of collisions with greater accuracy, generally resulting in fewer false negatives for the most frequent events since the correct value for an event is maintained over a sequence of samples unless every hash entry for that event is lost in a collision before the event occurs next. This can yield a more accurate rate for an event unless every hash function has a collision for event. By selecting hash functions that are mathematically independent, the probability that a collision would occur in all hash functions for any single event is proportional to the product of the sizes of the hash tables, even though the storage used and the time for periodically averaging or resetting rates are proportional to the sum of the sizes of the hash tables. Thus, the cost generally increases according to the sum, but the accuracy generally increases according to the product.

To reduce load on the system, when no attack is detected to be present (e.g., all average rates in all hash tables are below a specified threshold), every N packets in a pipeline instead of each packet in the pipeline may be sampled and analyzed. The packet counts and byte counts may be scaled linearly. For example, the estimated packet rate can be the actual count multiplied by N. Real-world network attacks generally exceed normal traffic levels by substantial margins so this inaccuracy in measurement is tolerable in various embodiments. Once an attack has been detected, the sampling rate is changed so that more packets (e.g., every packet in the pipeline) are processed and can be dropped according to the configured rate limit if the measured rate exceeds the configured threshold.

Sharing Rate Information among Load-Balanced Pipelines

With reference to FIG. 1, in order to handle higher incoming packet rates, packets are distributed by a load balancer to several, functionally generally identical pipelines. Depending on the algorithm used by the load balancer, some traffic patterns may result in very different loads in these pipelines, and if the user-configured thresholds and rate limits are simply divided by the number of pipelines and measured and enforced independently in these pipelines, significant false positives may result. For example, many packet load balancers usually ensure that packets will not be reordered within the flow of a higher level protocol by using the flow identifier in the balancing algorithm. Consequently, with a large number of copies of the pipeline, a single non-attack flow can exceed the limit. For example, for 20 pipelines, the threshold for each pipeline may be set to 5% of the total limit, but a single large file transfer on FTP or HTTP can exceed that limit, even if all the other pipelines are idle.

Requiring the pipelines to share the hash tables and calculated packet and byte rates, to address the problem described above, is generally computationally expensive, requiring software locking, expensive atomic-update operations, and/or other expensive hardware. Therefore, in various embodiments, each pipeline computes its own average rates for bytes and packets for each processed packet. These rates are periodically aggregated a smaller list including only those signatures that currently exceed the threshold may be preserved separately. This common rate/threshold information may be used by each pipeline to determine whether the threshold for a particular signature is exceeded. Moreover, the ratio of that pipeline's rate for the signature to the total rate for the signature can be used to allocate the corresponding rate limits. The rate limits are described below.

In one embodiment, there are two pipelines: P1 and P2. The number of hash tables in each pipeline is three, and that a signature S is of interest. For the first pipeline, let the rates of the signature S computed by the three hash tables be r1(1), r1(2), and r1(3), respectively. The value "1" in the symbol "r1" indicates that these are the tables associated with the pipeline P1. The indices in parenthesis indicate the particular hash table of P1, i.e., table 1, 2, or 3. The rate observed by the pipeline P1, denoted R1, can be computed as: R1=max (r1(1), r1(2), r1(3)}. The rate for the same signature S as observed by the pipeline P2, denoted R2, can be computed as: R2=max (r2(1), r2(2), r2(3)}. It should be understood that R1 and/or R2 can be based on one or more values thereof from previous computation intervals, such as a simple or a weighted average of the previous 3, 5, 10, etc., values of the respective rates. In some cases, the total rate for signature S, denoted RT, can then be computed as RT=R1+R2.

One way to determine whether the signature S represents an attack is to test if RT exceeds a threshold T. This test can generally be performed only when RT is updated—by adding R1 and R2 in this example. RT, however, need not be computed each time R1 and R2 are computed. As such, the comparison of RT with the threshold T may not use the latest values of (R1+R2) in some cases, which can increase the false negative error rate.

Another way, to minimize the false negative error rate, is to analyze the rates computed by each pipeline. To this end, in some embodiments, the signature S is determined to represent an attack if R1≥T/2 and/or if R2≥T/2. One disadvantage of this approach is that the load balancer (FIG. 1) may not distribute the arriving packets to the two pipelines evenly. In that case, R1 can easily exceed T/2, even though, RT is less than the threshold T and the signature S does not represent an attack. The use of a threshold value T/2 (T/N in general, if there are N pipelines) can thus increase both false positive and false negative rates. To address this, in some embodiments, the thresholds used by individual pipelines (also called rate limits) can be some preselected fractions of the threshold T. The fractional thresholds designated to one or more pipelines can be different.

In some embodiments, a test based on proportions is employed as follows:

P1 can determine an attack if R1≥T*(R1/RT), and
P2 can determine an attack if R2≥T*(R2/RT).

In this test, R1 is computed using the max and, optionally, a moving average, from the hash tables of the pipeline P1, as described above. Similarly, R2 is computed using the max (and optionally a moving average) from the hash tables of the pipeline P2, as also described above. The values of R1 and R2 may be computed at one frequency (e.g., once per second, ten times per second, 50 times per second, etc.), and the values of RT may be computed at another frequency that is typically less than the frequency at which R1 and R2 are computed. The thresholds used by each pipeline, i.e., T*(R1/RT) and T*(R2/RT), respectively, would be based on the most up-to-date rate calculations only partially. These thresholds, however, would be based on the most up-to-date values of R1 and R2, however, and would also take into consideration the contribution of each pipeline-specific rate to the total rate. As such, these embodiments can minimize false negative and/or false positive error rates.

Thus, if $R_i(S)$ is the rate observed on pipeline i for signature S, RT(S) is a function (e.g., a sum) of $R_i$ S across all pipelines. Each pipeline may calculate its threshold (also called rate limit) as: $T_i=T*R_i(S)/RT(S)$. In some embodiments, the threshold T can vary with each signature. Thus, instead of using a threshold T for all signatures, a signature-specific threshold, denoted T(S), can be used. Each pipeline may calculate its threshold as: $T_i(S)=T(S)*R_i(S)/RT(S)$.

It should be understood that the example above is illustrative only and that this technique is applicable to any number of pipelines such as 2, 3, 4, 7, 10, etc. The number of hash tables and hash functions used in each pipeline can also be any number such as 1, 2, 3, 5, 6, 9, etc. All pipelines need not use the same number of hash tables/hash functions. In general, assume that within a specified time window (e.g., half second, one second, five seconds, etc.) the maximum rate observed by a pipeline $P^1$ for a signature S1 is $R_1^{\ 1}$. The maximum rate represents the maximum of the rates determined using more than one hash functions and tables (and optional moving averages of a specified number of values computed in the previous windows, as described above, for the pipeline $P^1$. In general, the maximum rate observed by the k-th pipeline $P^k$ for the signature S1 is $R_k^{\ 1}$. For the specified time window, the maximum rates from all N pipelines can be aggregated using a function $f(\ )$, such as a simple sum, weighted sum, etc., to obtain an aggregate rate $\mathbb{R}^{\ 1}$ for the signature S1. If this aggregate rate $\mathbb{R}^{\ 1}$ reaches or exceeds a specified threshold $T^1$, the signature S1 can be designated to represent an attack. The value of $T^1$ can be based on the signature S1 or can be selected independently of the signature.

In some embodiments, whether the signature S1 represents an attack is determined by periodically computing $\mathbb{R}^{\ 1}$ and by comparing $\mathbb{R}^{\ 1}$ with $T^i$. Should the rate reach or exceed the threshold, all packets corresponding to the signature S1 may be blocked in all pipelines. In some embodiments, each pipeline computes a respective threshold based on a proportion of the rate observed by that pipeline to the total rate. Thus, for the k-th pipeline, the threshold/rate limit is computed as $$\tau_k = \frac{R_k^1}{\mathbb{R}^T} T^1.$$

Packets corresponding to the signature S1 may be blocked by the k-th pipeline if the observed rate $R_k^{\ 1}$ for that pipeline meets or exceeds the corresponding threshold $\tau_k$. The table below illustrates the computation of thresholds for two signatures.

| Signature | Max. Rate for Pipeline $P^1$ | Max. Rate for Pipeline $P^2$ | Max. Rate for Pipeline $P^N$ | Aggregate Rate/ Threshold | $P^1$ threshold | $P^2$ threshold | $P^N$ threshold |
|---|---|---|---|---|---|---|---|
| S1 | $R_1^{\ 1}$ | $R_2^{\ 1}$ | $R_N^{\ 1}$ | $\mathbb{R}^1 = f(R_1^{\ 1}, R_2^{\ 1}, \ldots, R_N^{\ 1})$ $T^1$ | $\tau_1^1 = \frac{R_1^1}{\mathbb{R}^1} T^1$ | $\tau_2^1 = \frac{R_2^1}{\mathbb{R}^1} T^1$ | $\tau_N^1 = \frac{R_N^1}{\mathbb{R}^1} T^1$ |
| S1 | $R_1^{\ 2}$ | $R_2^{\ 2}$ | $R_N^{\ 2}$ | $\mathbb{R}^2 = f(R_1^{\ 2}, R_2^{\ 2}, \ldots, R_N^{\ 2})$ $T^2$ | $\tau_1^1 = \frac{R_1^1}{\mathbb{R}^1} T^2$ | $\tau_2^1 = \frac{R_2^1}{\mathbb{R}^1} T^2$ | $\tau_N^1 = \frac{R_N^1}{\mathbb{R}^1} T^2$ |

In this, some time skew may be involved, but some delay and phase differences between the averages being summed may be tolerated in various embodiments. In particular, false negatives may be allowed to occur for moderately short durations (on the order of a few seconds) since sustained attacks of longer durations can be effectively blocked. A typical real-world attack persists for minutes or hours unless the attack is blocked.

In some embodiments, an attack is determined using more than one signatures. To this end, the multi-hash/average rate and associated switch to discard traffic are connected in series. Multi-hash detectors for more general signatures should appear later in this cascade than signatures that are less general. One example is a Service signature including (destination IP address, destination port, TTL, and protocol) is more specific than a Server signature containing only the destination IP address and protocol. Analyzing the more specific signature can reduce the packets to be processed by the more general filter, which can decreases the possibility for false positives being detected by this more general filter. There can be attacks, however, which may not be detected by any of the more specific filters but would be detected and blocked by the general filter. The false positives are not desirable but, in many circumstances, it may be better to tolerate some false positives rather than letting the entire attack through when nothing else has detected the attack.

Experimental Results

Figure 2A:
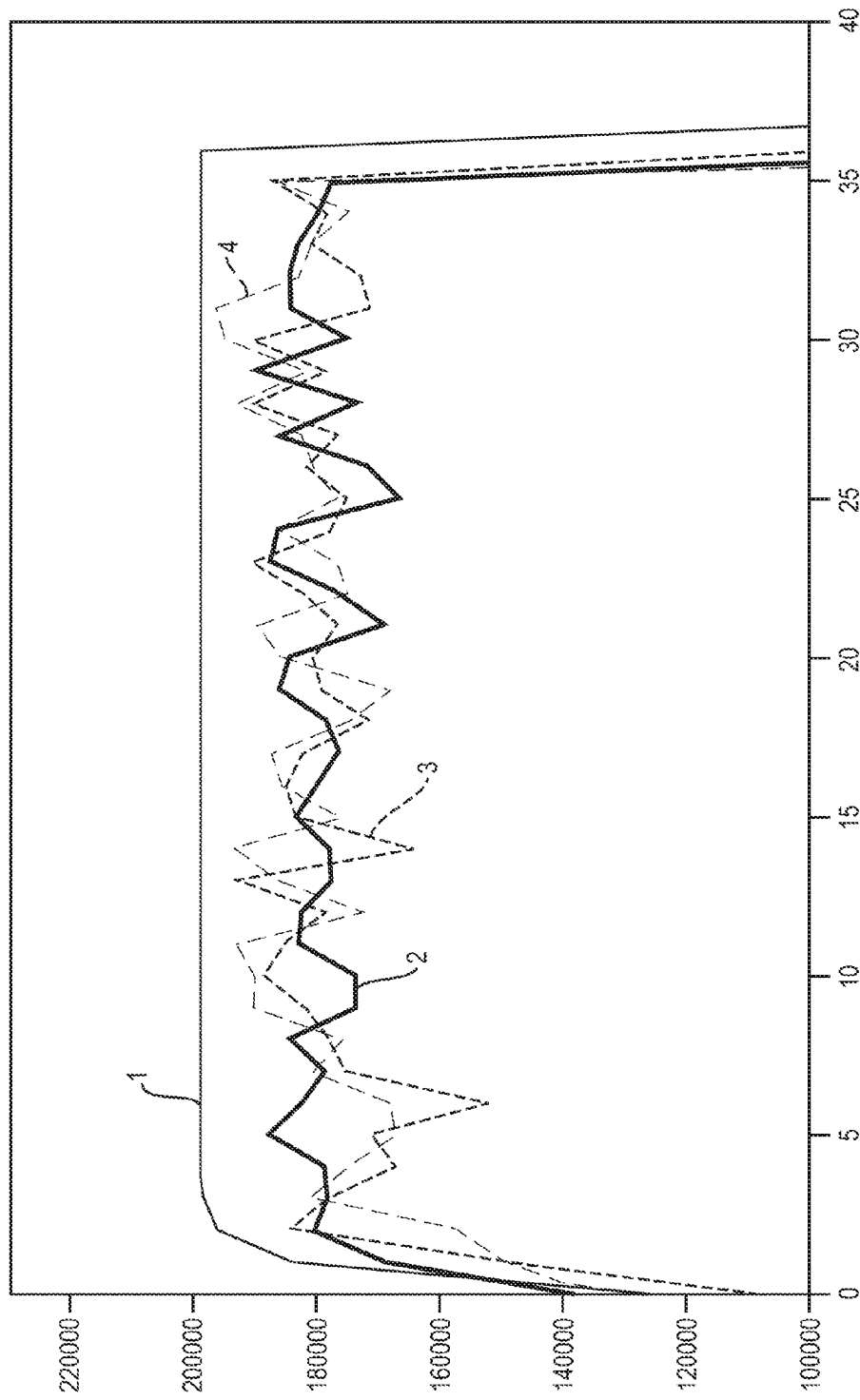

Rates were computed using 1, 2, and 4 hash tables with a total of 1024 entries (i.e. 1×1024 or 2×512, or 4×256). In FIG. 2A, the y-axis shows the detected rate of an attack, and the x-axis shows the time. In one experiment, a simulated attack was generated at approximately 200,000 packets per second. The input was only the attack traffic. Sample data was collected approximately every 10 seconds. Curve "1" shows that all embodiments (i.e., 1, 2, and 4 hash-table implementations) detected the attack. The left and right sides of Curve 1 show the effect of the exponential averaging. Note that the y-axis does not start at 0 and, as such, the start of the rising exponential and the tail of the falling exponential are not shown completely. Nevertheless, Curve 1 shows that the detected rate increases up to 200,000 packets per second when the sampling beings and decreased when the simulated attack ends.

The curves "2," "3," and "4" show the results for different embodiments of the ScoreCard systems having 1hash table, 2-hash tables, and 4 hash-tables, respectively, when the attack is processed along with simulated good traffic. The maximum rate across the different hash tables was used in computing the average rate for each signature. The good traffic included packets having enough number of different signatures to cause collisions in the hash table(s). The curves "2," "3," and "4" show that on the average, the embodiment using four hash tables performed better than the one using two hash tables, which performed better than the embodiment using only one has table. This is also shown in the table below.

| Embodiment | No. of Attacker Packets Sent | No. of Attacker Packets Blocked | No. of Attacker Packets Allowed to Pass Through (False Negatives) |
|---|---|---|---|
| 1 hash table | 142,500,000 | 142,054,485 | 445,515 |
| 2 hash tables | 142,500,000 | 142,295,782 | 204,218 |
| 4 hash tables | 142,500,000 | 142,388,846 | 111,154 |

The table above shows that the simulated rate of attack in each experiment, when mixed with good traffic, was 142,500,000 packets per second. The embodiment using one hash table permitted 445,515 attack packets to pass through; the embodiments using two hash tables permitted 204,218 attack packets to pass through, and the embodiment using four hash tables permitted 111,154 packets to pass through. Thus, the number of attack packets not blocked or the false negative rate decreased with the use of an increasing number of hash tables.

With reference to FIG. 2B, accuracy was measured for "normal" traffic, i.e., traffic lacking any packets from an attacker, and using traffic simulating attack, as well. In general, as the number of hash functions increased, more false negatives were detected. Without using sharing of maximum value across different hashes, a significant variation was observed in the throughput, as depicted in FIG. 2B, indicating that several packets from one or more attackers were not detected as effectively as they were when the maximum values were shared across different hashes.

Automatic Level Setting

In some instances, determining what level to use as the trigger for designating a packet as arriving from an attacker can be challenging because traffic levels can vary from site to site as well as over time at a particular site. A level that is too low can increase the false positive rate, while a level that is too high can increase a false negative rate. In various embodiments, standard deviation for key can be computed without incurring substantial computation overhead, and the trigger level or threshold can be determined using the standard deviation.

An exponential weighted average for the rate and square of the rate can be used to compute the average variance. The time constant ($\alpha$) for the variance used to set the threshold can be longer than the time constant used to average byte and packet rates (e.g. on the order of minutes rather than seconds), and packets which are above the threshold may be ignored when calculating the set point since the goal is to determine the limits of non-attack traffic.

In some embodiments, the averages are tracked over much longer time periods. For example, the average byte and packet rate for each scorecard (e.g., a hash function, pipeline, etc.) may be computed for each one minute period in a day (1440 different running averages), or week (10,080 averages). While it would take several months for the per-week data to stabilize, it can automatically compensate for variations like normal business hours in a particular country, including weekends. Some additional input may be collected to treat holidays without false positives.

In another improvement implemented in some embodiments, a matching hash entry where a collision occurs is not replaced if that entry has the highest current running average across different signatures. For two hashes, this means that only one of two hashes will get replaced unless they both have reached a zero average. This offers some optimizations in hash table usage but it also requires looping over all the hash tables twice. In some implementations, the second pass is only up to N−1 tables if the number of hash functions/tables is N.

Assume that a multi-hash table uses two hash functions $h\_p$ and $h\_q$. Assume that a signature S1 was observed 20 times so, for S1, each table has computed a rate of 20. Suppose a signature S2 is now received that collides with S1 for $h\_p$, but not for $h\_q$. At this time, "20" is the value for S1 in both tables. Because the table for $h\_p$ is the table with S1 at 20, the current maximum value across different signatures, that table is left unchanged and the values in the other table would be set to "1" for S2. The value for S1 in the table corresponding to the $h\_q$ would remain unchanged; a new entry for S2 would be created, because there was no collision for S1 and S2 using the hash function $h\_q$. Suppose after receiving S2, S1 was received five times. There would not be any collisions and both tables would be updated to "25." If S2 is received subsequently, only the value in the table corresponding to $h\_q$ would be updated because the entry in $h\_p$ is used by S1.

If, after some time, the average value for S2 exceeds the average value for S1, the entry for S1 in the table corresponding to $h\_p$ will be replaced with the value for S2, leaving one entry for signature S in $h\_q$ and entries for signature S2 in both tables, corresponding to the hash functions $h\_p$ and $h\_q$. Suppose that after some time, the average value in the table corresponding to $h\_q$ for signature S1 is 38 and the maximum value for signature S2 in the table corresponding to $h\_q$ is 103. A third signature S3 is received which collides with S1 in $h\_q$ and with S2 in $h\_p$. Since S1 is at 38 and S2 is at 103, the entry in $h\_q$ is reset to the value "1" for S3. Since the only entry for signature S1 was in the table corresponding to $h\_q$, the signature S1 is no longer being tracked and may be set to "1" if signature S1 is received again.

Rate Limits and Scorecard

In some embodiments, the configuration was enhanced to have a threshold and a rate limit for each Scorecard signature type. The parameters packets per second and bits per second may be provided for both the threshold and the rate limit. In one embodiment, packets are not affected by Scorecard system if measured packet rate and/or bit rate are below the corresponding threshold. If the observed rates are greater than the configured threshold, this generally indicates an ongoing attack. In some embodiments, if an attack is determined to exist, the rate limit is used to determine a response to the attack. Specifically, setting a low rate limit can blocks more packets, but increases the risk of false positives; setting a higher limit can reduce the number of false positives, but generally also allows more attack packets to reach a network device (e.g., a server) to be protected by the Scorecard system.

In some embodiments, setting the threshold below the rate limit effectively eliminates the threshold, since the rate limit will always be in effect when the actual rate exceeds the rate limit. In general, the threshold can be used to leave the traffic unaffected until it reaches a designated "clearly malicious" level and, then, a rate limit can be applied to control the traffic, without entirely blocking it, so that traffic from legitimate source is not completely blocked inadvertently.

Since only the first fragment of a fragmented datagram has UDP or TCP port information, the number of fragments can be estimated from the UDP datagram size to trigger the threshold and rate limit and record the datagram identification (source, dest, and packet id), and discard all subsequent fragments with the same datagram identification.

As described herein Scorecard system and process is intended to both detect an attack and defend that attack, e.g., by rate limiting packets in excess of the configured rates. In some filtering techniques, when an attack is detected, a filter expression is computed for blocking the attack. A filter typically performs a number of comparisons on the fields of the packet and, to this end, usually needs to reparse the packet headers to find fields that are to be compared (e.g., the start of the IP header). Some improved filtering techniques may avoid the need for parsing.

Unlike the filtering techniques, in various embodiments, Scorecard uses the fields to compute a hash value and looks up an address and "key" in a hash table. Comparisons on the address and key may be performed, but a key (also called signature) typically has several fields packed into a single value (e.g., a 64-bit value). As such, in various embodiments, Scorecard generally requires fewer compare and branch operations. The other techniques also do not employ sharing of maximum rates across several hash tables, to optimize false negative and false positive rates. Scorecard is unique in implementing an on-line, real-time or near-real time algorithm using bounded time and memory, that can simultaneously (e.g., not exactly at the same moment but in a single processing step), detect and block, entirely or at a specified rate limit, the packets that are identified as arriving from an attacker.

Figure 3:
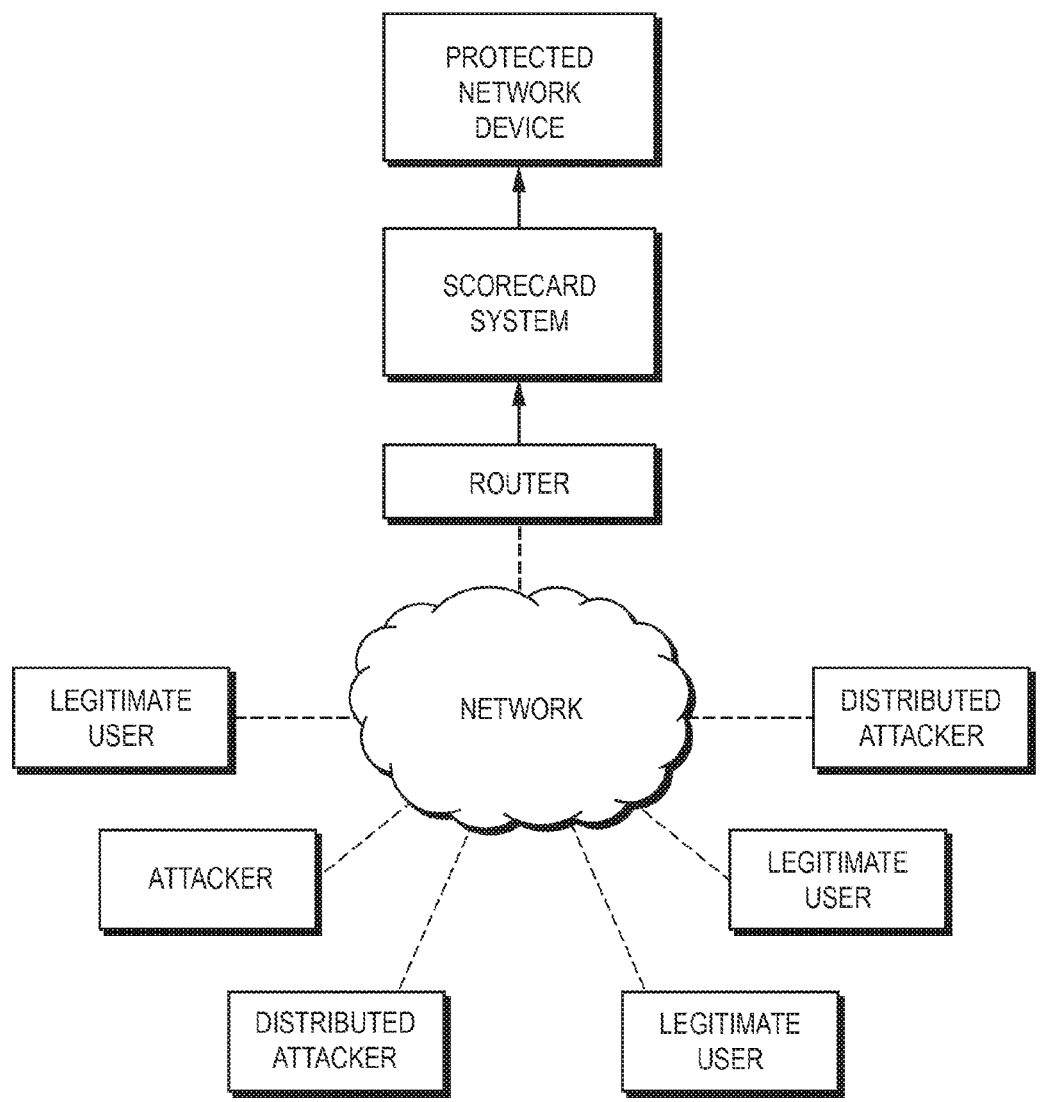
FIGS. 3 and 4 schematically depict environments in which various embodiments of the ScoreCard system can be operated.
Figure 4:
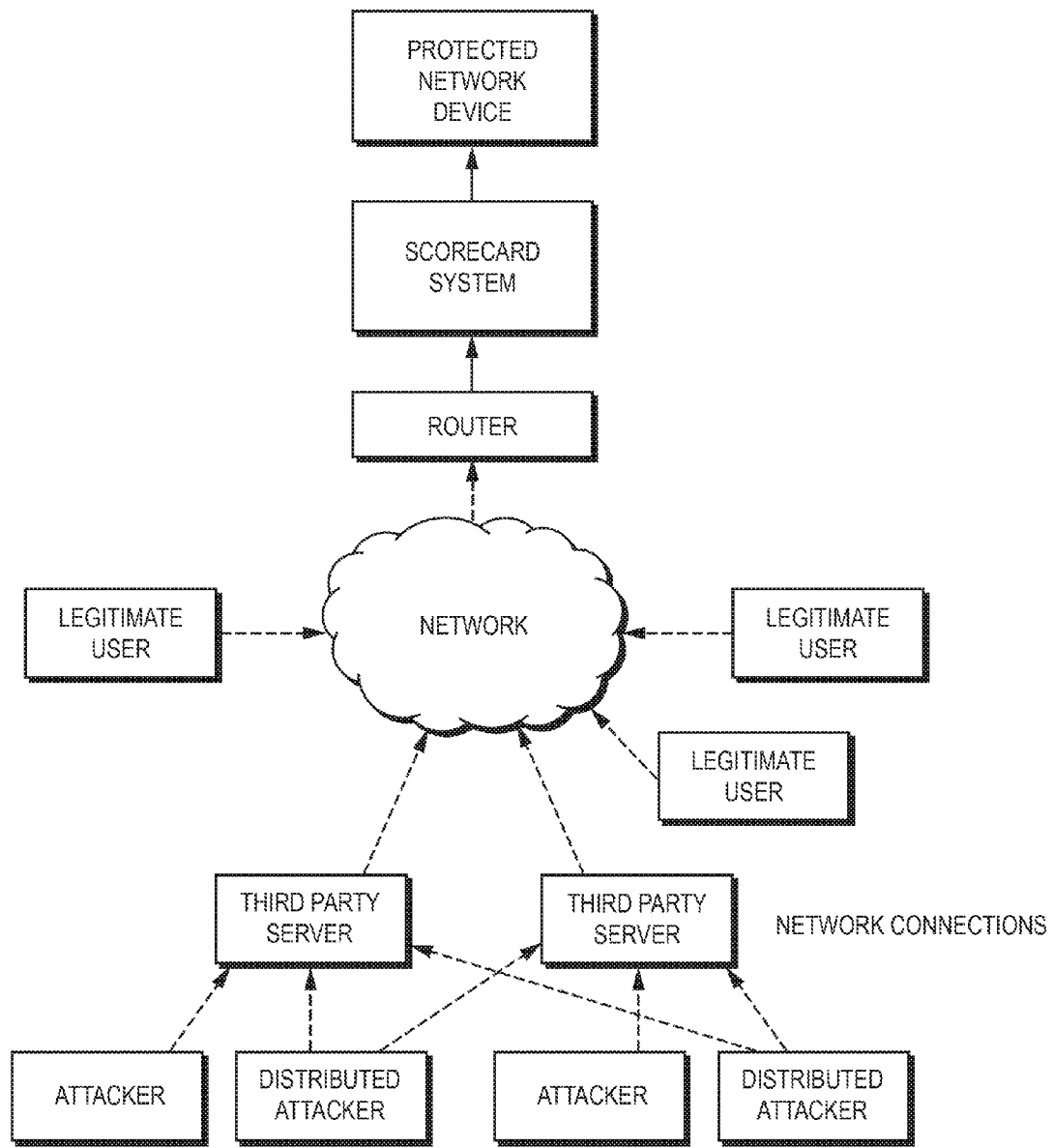

FIGS. 3 and 4 depict typical environments of embodiments of a Scorecard system. With reference to FIG. 3, several legitimate users (servers, client computers, etc.) can send packets to a protected network device through a network (e.g., the Internet). Attacker(s), including one or more distributed attackers may also send packets to the protected network device. All of these packets form a sequence of packets, that is processed by an embodiment of a Scorecard system described with reference to FIG. 1. Some packets may be blocked as necessary and the other packets are forwarded to the protected device, mitigating vulnerability thereof.

With reference to FIG. 4, the attacker(s) and distributed attacker(s) send requests/packets to one or more third-party devices/servers, and cause these third-party devices to respond by sending packets to a targeted device (e.g., the protected network device). As such, these third-party devices and other legitimate users send packets to the protected server through a network. All of these packets form a sequence of packets, that is processed by an embodiment of a Scorecard system described with reference to FIG. 1. Here again, some packets may be blocked as necessary and the other packets are forwarded to the protected device, mitigating vulnerability thereof.

In some embodiments, for a given signature, in a pipeline P1, during a single observation window (denoted $\delta 1$): (A) rates may be updated in different hash tables where there is no collision, and (B) the maximum of those rates may be determined. These rates are generally specific to the observation window. The steps (A) and (B) may be repeated for the same signature but in another observation window (denoted $\delta 2$). A moving average of the maximum rates from the two observation windows may be computed. The computation of the moving average may be performed over more than two (e.g., 3, 5, 8, 10, 20, etc.) observation windows. The moving average can be a simple average, a weighted average, or an exponential average.

In some embodiments, the steps (A) and (B) are repeated for the same signature but in another pipeline P2, during the observation window $\delta 1$. In addition, these steps may be repeated for the same signature in the pipeline P2 during the observation window $\delta 2$. Thus, another average rate for the signature may be computed in pipeline P2. In general, the average rate may be computed in more than two (e.g., 3, 4, 7, 12, 15, etc.) pipelines. The two average rates from the two pipelines may be aggregated (e.g., summed) to obtain a total average rate for the signature. The aggregate (e.g., simple sum, weighted sum, etc.) may be computed over more than two (e.g., 3, 4, 7, 10, 15, etc.) pipelines. Thus, some embodiments employ a single pipeline and some embodiments employ two or more pipelines.

The sampling of the arriving packets can be performed, i.e., the duration of the observation window(s) and/or the time period between two consecutive observation windows can be selected, according to a particular frequency such as once every 10 seconds, once every 5 seconds, once every 2 seconds, once per second, two times per second, 10 times per second, etc. The average signature rates can be aggregated across pipelines at the same frequency at which sampling is done or at a different frequency.

In some embodiments, a signature represents an attack if the aggregate signature rate is greater than or equal to a specified threshold, which can be signature specific or independent of the signature. The sampling frequency may be increased when the network device is determined to be under an attack. The sampling frequency may be decreased when the network device is determined not to be under an attack.

In some embodiments, a rate limit can be applied in one or more pipelines. The rate limit applied in a pipeline may be proportional to a ratio of the average rate computed by that pipeline and the total or aggregate rate. In a particular pipeline, if the average signature rate for a certain signature reaches or exceeds the rate limit designated to that pipeline, the network device may be determined to be under attack. Additionally or in the alternative, at least a percentage of the arriving packets that are associated with the signature can be rejected, dropped, or blocked when the average signature rate at that particular pipeline reaches or exceeds the rate limit designated to that pipeline. The sampling frequency can be increased (or decreased) if the network device is determined to be susceptible to an attack based on the fact that the average signature rate in a pipeline has reached or exceeds the rate limited designated to that pipeline for a particular signature (or is determined not to be susceptible to an attack based on the fact that the average signature rate in a pipeline is below the rate limited designated to that pipeline for a particular signature).

In some embodiments, an aggregate of the maximum rates during a single observation window, $\delta 1$, is computed across two or more pipelines. Thereafter, a moving average of that aggregate is computed over several observation windows. Thus, in some cases, moving averages across different observation windows are computed for each pipeline, and the average rates from the pipelines are aggregated. In some cases, the rates from individual observation windows are aggregated across the pipelines first, and then a moving average of those aggregated rates is computed across different observation windows.

The packets arriving at the network system to be protected may be distributed into one or more pipelines. The signatures that are processed by one or more pipelines may be generated by each individual pipeline. Alternatively, the signatures may generated outside the pipelines, by another module, and may be supplied to the one or more pipelines. The signatures may include more than one hierarchical signatures and, in a hierarchy of signatures, the signatures are typically ordered from more general to more specific signatures. In some embodiments, a rate corresponding to a particular signature at a particular hash table is reset if a collision between that signature and another signature occurs at that hash table. In some embodiments, the rate at a hash table in a pipeline is reset only if that rate is not the local maximum rate across all of the hash tables in that pipeline. In some embodiments, the rates in all hash tables of a pipeline are updated to the local maximum rate for a particular signature, or for some or all signatures.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, We claim:

1. A method for facilitating protection of a network system, the method comprising performing by at least one processor the steps of:
   in a first module receiving packets, for a signature, during a first observation window:
   (a) computing a plurality of indices using a plurality of hash functions and the signature;
   (b) for each non-colliding index from the plurality of indices, updating a respective signature rate, representing a frequency of occurrence of the signature in the first module during the first observation window;
   (c) designating a maximum of the signature rates that correspond to the non-colliding indices and that are updated during the first observation window as a first local maximum signature rate for the first module for the first observation window; and
   (d) setting a signature rate for the signature at a colliding index using the first local maximum signature rate for the first module for the first observation window.

2. The method of claim 1, further comprising:
   in the first module, for the signature, during a second observation window:
   (e) repeating the steps (a) through (d) to obtain a second local maximum signature rate for the first module for the second observation window; and
   (f) averaging the first and second local maximum signature rates for the first module to obtain an average signature rate for the first module.

3. The method of claim 2, wherein the averaging step comprises computing one of:
   (i) a simple average, (ii) a weighted average, and (iii) an exponential average.

4. The method of claim 2, further comprising:
   in a second module, for the signature, during the first observation window:
   (g) repeating the steps (a) through (d) to obtain a third local maximum signature rate for the second module for the first observation window;
   in the second module, for the signature, during the second observation window:
   (h) repeating the steps (a) through (d) to obtain a fourth local maximum signature rate for the second module for the second observation window; and
   (i) averaging the third and fourth local maximum signature rates for the second module to obtain an average signature rate for the second module.

5. The method of claim 4, further comprising:
   (j) computing an aggregate rate for the signature by aggregating the average signature rate for the first module and the average signature rate for the second module.

6. The method of claim 5, further comprising determining according to a first frequency at least one of: (i) a duration of the first observation window, and (ii) a time period between the first and second observation windows.

7. The method of claim 6, wherein computing the aggregate is performed at one of: the first frequency and a second frequency different from the first frequency.

8. The method of claim 5, further comprising:
   determining that the network device is susceptible to an attack when the aggregate rate for the signature is at least equal to a specified threshold.

9. The method of claim 8, further comprising increasing a frequency according to which at least one of: (i) a duration of the first observation window, and (ii) a time period between the first and second observation windows is determined.

10. The method of claim 5, further comprising:
    designating a rate limit to the first module for the signature, the rate limit being based on a specified threshold and a ratio of the average signature rate for the first module to the aggregate rate for the signature.

11. The method of claim 10, further comprising at least one of:
    (i) determining that the network device is susceptible to an attack when the average signature rate for the first module is not less than the rate limit designated to the first module for the signature, and (ii) blocking at least a fraction of packets that are received at the first module and that are associated with the signature when the average signature rate for the first module is not less than the rate limit designated to the first module for the signature.

12. The method of claim 11, further comprising increasing a frequency according to which at least one of: (i) a duration of the first observation window, and (ii) a time period between the first and second observation windows is determined, when the network device is determined to be susceptible to an attack.

13. The method of claim 1, further comprising:
    in a second module, for the signature, during the first observation window:
    (k) repeating the steps (a) through (d) to obtain a third local maximum signature rate for the second module for the first observation window; and
    (l) computing a first aggregate rate for the signature for the first observation window by aggregating the first local maximum signature rate for the first module for the first observation window and the third local maximum signature rate for the second module for the first observation window.

14. The method of claim 13, further comprising:
    computing a second aggregate rate for the signature for a second observation window; and
    computing an average of the first and second aggregate rates for the first and second observation windows, respectively, for the signature.

15. The method of claim 1, further comprising generating the signature by selecting respective values of a plurality of fields of a packet.

16. The method of claim 15, wherein the plurality of fields is selected for detecting at least one of service flood, reflection flood, and server flood.

17. The method of claim 1, further comprising:
generating a plurality of different signatures for a single packet, each signature comprising respective values of a respective group of fields of the packet; and
performing steps (a) through (d) for each one of the plurality of signatures.

18. The method of claim 17, wherein the plurality of signatures is ordered according to a specificity of the signature prior to step (a).

19. The method of claim 1, further comprising distributing packets in a sequence of packets to a plurality of modules comprising the first module.

20. The method of claim 1, further comprising updating a signature rate at each non-colliding index to the first local maximum signature rate for the first module for the first observation window.

21. A system for facilitating protection of a network system, the system comprising:
a first processor; and
a first memory in electrical communication with the first processor, the first memory comprising instructions which, when executed by a first processing module in electronic communication with a first memory module, configure the first processing module for receiving packets during a first observation window, and program the first processing module, for a signature, to:
(a) compute a plurality of indices using a plurality of hash functions and the signature;
(b) for each non-colliding index from the plurality of indices, update a respective signature rate, representing a frequency of occurrence of the signature in the first processing module during the first observation window;
(c) designate a maximum of the signature rates that correspond to the non-colliding indices and that are updated during the first observation window as a first local maximum signature rate for the first processing module for the first observation window; and
(d) setting a signature rate for the signature at a colliding index using the first local maximum signature rate for the first module for the first observation window.

22. The system of claim 21, wherein the instructions further program the first processing module, for the signature, during a second observation window, to:
(e) repeat the operations (a) through (d) to obtain a second local maximum signature rate for the first module for the second observation window; and
(f) average the first and second local maximum signature rates for the first processing module to obtain an average signature rate for the first processing module.

23. The system of claim 22, wherein to obtain the average signature rate for the first processing module, the instructions program the first processing module to compute one of: (i) a simple average, (ii) a weighted average, and (iii) an exponential average.

24. The system of claim 22, wherein the instruction program a processing second module:
(g) for the signature, during the first observation window, to repeat the operations (a) through (d) to obtain a third local maximum signature rate for the second processing module for the first observation window;
(h) for the signature, during the second observation window, to repeat the operations (a) through (d) to obtain a fourth local maximum signature rate for the second processing module for the second observation window; and
(i) average the third and fourth local maximum signature rates for the second processing module to obtain an average signature rate for the second processing module.

25. The system of claim 24, wherein the instruction program a processing unit to:
(j) compute an aggregate rate for the signature by aggregating the average signature rate for the first processing module and the average signature rate for the second processing module.

26. The system of claim 25, wherein the instructions program the processing unit to determine according to a first frequency at least one of: (i) a duration of the first observation window, and (ii) a time period between the first and second observation windows.

27. The system of claim 26, wherein the instructions program the processing unit to compute the aggregate rate for the signature at one of: the first frequency and a second frequency different from the first frequency.

28. The system of claim 25, wherein the instructions program the processing unit to:
determine that the network device is susceptible to an attack when the aggregate rate for the signature is at least equal to a specified threshold.

29. The system of claim 28, wherein the instructions program the processing unit to increase a frequency according to which at least one of: (i) a duration of the first observation window, and (ii) a time period between the first and second observation windows is determined.

30. The system of claim 25, wherein the instructions program the processing unit to:
designate a rate limit to the first processing module for the signature, the rate limit being based on a specified threshold and a ratio of the average signature rate for the first module to the aggregate rate for the signature.

31. The system of claim 30, wherein the instructions further program the first processing module to at least one of:
(i) determine that the network device is susceptible to an attack when the average signature rate for the first processing module is not less than the rate limit designated to the first processing module for the signature, and (ii) block at least a fraction of packets that are received at the first processing module and that are associated with the signature when the average signature rate for the first processing module is not less than the rate limit designated to the first processing module for the signature.

32. The system of claim 26, wherein the instructions program the processing unit to increase a frequency according to which at least one of: (i) a duration of the first observation window, and (ii) a time period between the first and second observation windows is determined, when the network device is determined to be susceptible to an attack.

33. The system of claim 21, wherein the instructions:
(k) program a second processing module, for the signature, during the first observation window, to repeat the operations (a) through (d) to obtain a third local maximum signature rate for the second processing module for the first observation window; and (l) program the processing unit to compute a first aggregate rate for the signature for the first observation window by aggregating the first local maximum signature rate for the first processing module for the first observation window and the third local maximum signature rate for the second processing module for the first observation window.

34. The system of claim 33, wherein the instructions program the processing unit to:
compute a second aggregate rate for the signature for a second observation window; and
compute an average of the first and second aggregate rates for the first and second observation windows, respectively, for the signature.

35. The system of claim 21, wherein the instructions program at least one of the first processing module and the processing unit to generate the signature by selecting respective values of a plurality of fields of a packet.

36. The system of claim 35, wherein the plurality of fields is selected for detecting at least one of service flood, reflection flood, and server flood.

37. The system of claim 21, wherein the instructions program at least one of the first processing module and the processing unit to:
generate a plurality of different signatures for a single packet, each signature comprising respective values of a respective group of fields of the packet; and
program the first processing unit to perform the operations (a) through (d) for each one of the plurality of signatures.

38. The system of claim 37, wherein the plurality of signatures is ordered according to a specificity of the signature prior to performing the operation (a).

39. The system of claim 21, wherein the instructions program the processing unit to distribute packets in a sequence of packets to a plurality of processing modules comprising the first processing module.

40. The system of claim 21, wherein the instructions program the first processing module to reset a signature rate at a colliding index.

41. The method of claim 21, wherein the instructions program the first processing module to reset a signature rate at a colliding index only if the signature rate at the colliding index is less than the first local maximum signature rate for the first processing module for the first observation window.

42. The system of claim 21, wherein the instructions program the first processing module to update a signature rate at each non-colliding index to the first local maximum signature rate for the first processing module for the first observation window.

* * * * *